United States Patent [19]

Fraser

[11] 4,114,287
[45] Sep. 19, 1978

[54] ACID RESISTANT FREEZE DRYING TRAP

[75] Inventor: Douglas S. Fraser, New Paltz, N.Y.

[73] Assignee: FTS Systems, Inc., Stone Ridge, N.Y.

[21] Appl. No.: 761,471

[22] Filed: Jan. 24, 1977

[51] Int. Cl.² ............... F26B 13/30; B01D 5/00
[52] U.S. Cl. ............................. 34/92; 34/76; 62/55.5
[58] Field of Search .............. 34/5, 92, 76; 62/55.5

[56] References Cited
U.S. PATENT DOCUMENTS

| 2,163,996 | 6/1939 | Flosdorf | 34/76 |
| 3,574,950 | 4/1971 | Dantoni | 34/92 |
| 3,871,107 | 3/1975 | Broadwin | 34/92 |

Primary Examiner—John J. Camby
Attorney, Agent, or Firm—Robert E. Wagner; Thomas L. Kautz; Gerald T. Shekleton

[57] ABSTRACT

A new and improved corrosion resistant condenser is provided, adapted for use with a freeze drying system for dehydration of materials with relatively high concentrations of acids or bases. The condenser includes unique heat transfer means for uniform transfer of heat flow between the outer surface of the condenser and a corrosion resistant condensing trap disposed inside the condenser, which condensing trap may be readily removed from the system and immediately replaced in preparation for another freeze drying procedure.

11 Claims, 3 Drawing Figures

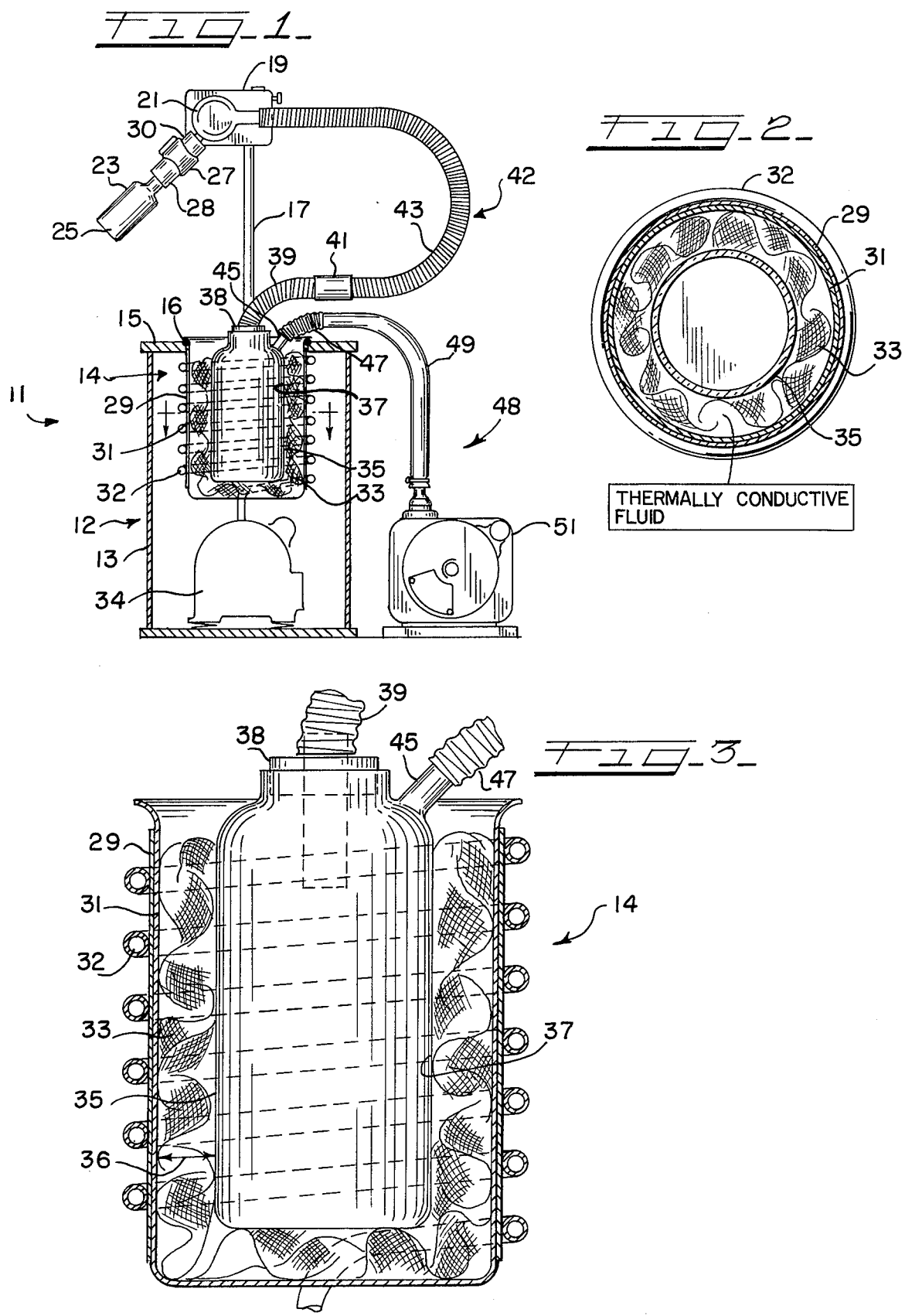

ACID RESISTANT FREEZE DRYING TRAP

FIELD OF THE INVENTION

This invention relates to the field of freeze drying and, more particularly, to the provision of a corrosion resistant condenser in freeze drying system used for drying materials with relatively high concentrations of acids or bases.

BACKGROUND OF THE INVENTION

The art of freeze drying has provided an efficient technique for preserving products for human and animal medicinal use. Preservation of plasma, hormones, viral vaccines, enzymes and tissue are but a few of the applications of modern freeze dryers. The process of freeze drying is similar to vacuum distillation, except that the material to be dried must be solidly frozen before it is subjected to a high vacuum and controlled heat input. Four conditions must be obtained to accomplish proper freeze drying. Briefly, the product to be dehydrated must be solidly frozen, secondly, a heat source must be employed to provide the heat of sublimation necessary to drive the water content of the material directly from its solid state to the vapor state, thirdly, a condensing surface is required, and finally, the system must be provided with a vacuum. The end product of this dehydration process is virtually identical to the original material, minus its water content.

In the past, the primary concern of prior art freeze dryer designs was to accommodate heat sensitive materials without particular concern for the corrosive properties of the materials to be dried. Use of freeze dryers in recent years has expanded to include all kinds of materials including those with a relatively high acid or base content. Users of conventional freeze dryers have discovered that the walls, and particularly, the bottom corners of stainless steel condensers, are susceptible to significant corrosion as acidic and basic vapors are condensed there during the freeze drying process. Protective coating such as that denoted under the trademark Teflon ® have been tried, but were found to peel or to be too porous.

Many users have attempted to reduce the corrosion caused by caustic vapors by employing techniques designed to accelerate the defrosting process. However, even prompt removal of the ice formed during dehydration does not completely prevent deterioration. Corrosion begins shortly after the defrosting cycle takes place. The refrigerated fluid circulating through the condensing coils during operation is replaced with a hot gas for defrosting, causing the layer of ice at the interface of the condenser to melt almost immediately. The corrosive effect of the liquid acid or base existing at the interface continues until all of the ice is removed and the condenser fully cleaned and dried.

In addition to problems of corrosion, the stainless steel condensers used in certain prior art structures must be fully cleaned and drained after defrosting. A subsequent user who begins a freeze drying run without completely draining the condenser will most certainly contaminate any oil sealed vacuum pump almost immediately. Large amounts of corrosive materials will permanently damage a pump and most probably necessitate its replacement. Accidents of this nature are not uncommon where a single freeze dryer is used by several departments in the same laboratory. Even assuming proper care is used to clean prior art condensers, subsequent freeze drying runs are delayed until the thawing, cleaning and draining process is completed.

SUMMARY OF THE INVENTION

Accordingly, the present invention provides a freeze drying condenser which is suitable for use with acidic or basic vapors, so that the freeze drying system may be used with any material, without particular concern for its corrosive content. The condenser includes an upstanding beaker-shaped pot having an open top, made of stainless steel or an equivalent. A thin sheet of material such as copper, with high thermal conductivity, is wrapped around the pot in intimate contact thereto. Disposed along the inner surfaces of the pot is a flexible mesh of copper or a similar thermally conductive material. A condensing trap of glass or other suitable material, operatively attached to a vacuum source and manifold, is inserted into the pot in a direct heat transfer relationship with the mesh. If desired, the narrow space between the trap and the pot may be filled with alcohol or some other heat transfer fluid to assist the mesh in conducting the heat away from the trap.

A means of refrigeration is disposed about the outer surface of the pot to supply cooling to the trap. Vapors produced during the dehydration process migrate to the trap and condense on its interior surfaces. Due to its inexpensive construction, the trap may then be removed and immediately replaced by another trap, thus preparing the system for another freeze drying run. This eliminates the down time associated with prior art systems required for thawing and cleaning condensers which are a fixed part of the unit.

Therefore, in consideration of the deficiencies of prior art structures, it is an object of the invention to provide a freeze drying system capable of drying corrosive materials without causing deterioration of the system's elements.

It is a further object of the present invention to provide a new and improved corrosion resistant condenser for use in such a freeze drying system.

It is a still further object of the present invention to provide a means to efficiently transfer thermal energy to a vacuum condensing trap which may be easily removed and replaced after each drying procedure in preparation for another procedure.

DESCRIPTION OF THE DRAWINGS

Objects in addition to those specifically set forth will become apparent from reference to the accompanying drawings and following description wherein:

FIG. 1 is a perspective view of a freeze drying apparatus including the present invention;

FIG. 2 is a cross-sectional view of the present invention, taken along the line 1–1 of FIG. 1; and, FIG. 3 is an enlarged cross-section of the present invention.

DETAILED DESCRIPTION OF THE INVENTION

Referring to FIG. 1, a manifold-type freeze drying system is depicted generally by reference numeral 11. The system shown includes a cabinet 12, having a normally vertically extending sleeve 13, capped by a vacuum plate 15 made of clear acrylic or an equivalent. An opening (not shown) in the vacuum plate 15 receives the corrosion resistant condenser unit of this invention depicted generally by 14, which will be discussed in detail below. Extending from the vacuum plate 15 and attached thereto is a support rod 17. Attached to the free end of support rod 17 is a manifold support 19 which houses a manifold 21. The present embodiment shows a manifold with a single port, but multi-port manifolds are readily adaptable to this system. A drying flask 23, containing a pre-frozen sample 25, is attached by a nipple 28 to a vacuum valve 27. A second nipple 30 connects the vacuum valve 27 to the manifold 21. As discussed in more detail below, vapors sublimated from the sample 25 are introduced into the freeze drying system through the manifold 21, by opening vacuum valve 27. After dehydration, the product left in the drying flask 23 is nearly identical to the original substances less its water content.

Heat of sublimation is provided by ambient heat transmitted through the walls of the drying flask 23 by convection and radiation. The embodiment shown in FIG. 1 shows the sample 25, pre-frozen by any conventional method, such as shell freezing or pellet freezing, which provides a large exposed surface area to increase the speed of the drying process.

Referring to FIG. 3 as well as FIG. 1, the condenser unit 14 is inserted into the opening in vacuum plate 15 and is sealed thereto by rim gasket 16. The condenser unit 14 includes a copper sheet 29 fitted to the outside surface of a beaker-shaped pot 31, of stainless steel or an equivalent, having an open top. Condensing coils 32, containing a suitable refrigerant fluid are connected to a compressor 34 and helically wound around the surface of the copper sheet 29. A flexible mesh 33, made of highly conductive material such as copper, discussed in detail below, is inserted inside the pot 31 and completely covers its inner surfaces.

A condensing trap 35 having the shape of a hollow elongated cylindrical member with an opening at the top, is inserted into the pot 31 in intimate contact with the mesh 33. The mesh 33 acts like a sock as it is squeezed against the pot 31 by the trap 35, and is formed to the shape of the trap 35. A stopper 38, formed with a central bore (not shown), is forced into the opening in the trap 35 forming a tightly sealing friction fit. A first flexible stainless steel tube 39 is attached at one end to the stopper 38, covering its central bore, and at the other end to a connector 41. A second flexible tube 43, made of stainless steel, extends from the connector 41 and is operatively attached to the manifold 21 at the other end. Thus, a first conduit 42 is formed connecting the trap 35 to the manifold 21. A hollow cylindrical stem 45 opening into the interior of trap 35, extends from the surface of the trap 35 at a point just below its top. A third flexible stainless steel tube 47 is attached at one end to the stem 45, and at the other end to a vacuum hose 49 which is operatively attached to the vacuum pump 51. Thus, a second conduit 48 is formed from the trap 35 to the vacuum pump 51.

The freeze drying process proceeds as follows. The refrigerant fluid flowing through the condensing coils 32 lowers the overall surface temperature of the outer sheet 29, and thermal energy is transferred from the trap 35 to the coils 32, as discussed in detail below, thereby cooling the condensing surface 37 of the trap 35 to a temperature well below that of the pre-frozen sample 25. Vacuum pump 51 introduces a vacuum into the system from second conduit 48, through the trap 35, and into first conduit 42. The vacuum is then extended to the pre-frozen sample 25 by opening vacuum valve 27. Vapors are introduced into the system as the ambient heat transferred through the walls of the drying flask 23 sublimates the moisture content of the sample 25.

Efficient transfer of thermal energy from the sheet 29 to the trap 35 is necessary to maintain the temperature of the condensing surface 37 at a proper level. The temperature difference between the sample 25 and trap 35 creates a vapor pressure differential. Proper temperature levels in the trap 35 will cause vapors produced in the drying flask 23 to diffuse to the lower pressue area surrounding the trap 35, where they will condense on the condensing surface 37 back to their solid form. Without proper cooling of the trap 35, incomplete diffusion of the caustic vapors can occur. Those vapors which fail to migrate to the trap 35 could enter the vacuum pump 51 or condense elsewhere in the system, and begin corrosion.

Accordingly, as shown in FIG. 2, as well as FIG. 3, the present invention provides a unique and efficient means of transferring thermal energy from the condensing surface 37 of the condenser unit 14 to its outer surface. The copper sheet 29 is approximately 0.020 inches thick and is wrapped around the pot 31 before the condensing coils 32 are attached. Heat flow is a function of temperature difference and area. If the coils 32 were attached directly to the pot 31, the spaces between the coils 32 would not be efficiently cooled since the stainless steel of the pot 31 is a poor thermal conductor. The cooper sheet 29, however, has excellent thermal conductive properties and the spaces between the coils 32 are cooled much more efficiently by attaching the coils 32 to the copper sheet 29 instead of the pot 31. The copper sheet 29 distributes the cooling uniformly and therefore creates a larger cooled surface are than can be obtained using a stainless steel surface. The larger cooled surface area provided by the copper sheet 29 thus greatly improves the heat flow propertes of the condenser 14. Rather than using coils 32 and compressor 34, in a mechanical refrigeraion system, the condenser unit 14 could be immersed into an appropriate cooling bath, providing an alternative means of refrigeration.

The present invention provides a novel method of uniformly transmitting thermal energy between the condensing surface 37 of the trap 35 and pot 31. Referring to FIG. 3, a mesh 33 in intimate contact with both the trap 35 and the pot 31 forms a "sock" around the trap 35 as it is squeezed against the inner surfaces of the pot 31. The space 36 between the pot 31 and the trap 35 is exaggerated in FIG. 3 for purposes of illustration. In actual application, the exterior dimension of the trap 35 is only slightly less than the inner dimension of the pot 31, creating a small space wherein the mesh 33 is disposed.

The mesh 33 may be used in conjunction with an appropriate thermally conductive liquid as indicated in FIG. 2, or alone. Use of a thermally conductive liquid by itself, as an interface, has been found to cause temperature stratification along the surface of the trap 35 and therefore, non-uniform cooling. However, used together, the mesh 33 impedes flow of the liquid and thus virtually eliminates the temperature stratification problem. The mesh 33 is made by combining a plurality of strands of copper or a material with similar thermal conductivity properties. As discussed in reference to the copper sheet 29 above, the excellent thermal conductive properties of copper, made into strands to form the mesh 33 herein, provides uniform transferral of thermal energy along the walls of the trap 35. Efficient and uniform transmission of thermal energy between the trap 35 and the coils 32 maintains the condensing surface 37 at a temperature low enough to insure proper diffusion of vapors from the sample 25 to the trap 35, thereby minimizing the amount of condensation on other elements in the system.

In addition to the favorable heat transfer characteristics of the present invention, migration of vapors to the trap 35 is aided by the baffling effect provided by the structure of the system. As best seen in FIG. 1, the sample 25 is disposed at some distance above the trap 35. Vapors sublimated from the sample tend to migrate to the trap 35 due to the force of gravity. The stem 45 leading to the vacuum pump 51, is disposed at an angle up and away from the condensing surface 37 of the trap 35, thereby decreasing the likelihood of condensation in the second conduit 48 or the vacuum pump 51 itself. Therefore, gravity in addition to the vapor pressure differential created in the system, is an important factor in obtaining proper vapor diffusion.

As discussed above, a significant deficiency associated with prior art devices is the down time required for thawing and cleaning condensers which are a fixed part of the unit. In addition, partially cleaned condensers containing residual pools of corrosive liquid will certainly contaminate most vacuum pumps should a subsequent user fail to completely drain the system prior to beginning a drying run. A unique feature of the present invention virtually eliminates these problems. The trap 35 is constructed of an inexpensive material such as glass or a similar inert substance, which provides the condensing surface rather than stainless steel. Where prior art structures used a stainless steel container as the condensing surface, the present invention uses a stainless steel pot 31 as a container to support the mesh 33 and trap 35 disposed therein. No condensation occurs on the stainless steel pot 31, since the corrosive vapors are confined in the closed system formed by the manifold 21, trap 35, vacuum pump 51 and connecting conduits 42 and 48.

When the trap 35 is ready for defrosting, it is quickly and easily removed from the system by withdrawing it from the pot 31, and another trap 35 may be immediately inserted into the pot 31 in preparation for another drying procedure. The pot 31, which is expensive as compared to the trap 35, is thus protected from corrosion and its useful life is greatly extended. This feature also allows for use of traps made from stainless steel, if desired. The replacability reduces prolonged exposure of any one trap to corrosive elements and increases the life of the traps.

Use of a removable trap 35 eliminates the delay associated with thawing and cleaning prior art condensers which were a fixed part of the unit and had to be defrosted in place. Also, by removing the trap 35 for defrosting, the likelihood that a subsequent user may begin a freeze drying procedure with a partially drained or incompletely cleaned condenser is greatly reduced.

The present invention thus provides a novel heat transfer means for uniformly transmitting thermal energy via convection between a condensing pot and a relatively inert and corrosion resistant trap which may be readily removed from the system and then replaced by another trap, allowing for immediate reuse of the freeze drying system.

While the invention has been described with reference to a preferred embodiment, it will be understood by those skilled in the art that various changes may be made and equivalents may be substituted for elements thereof without departing from the scope of the inventon. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A freeze drying system particularly adapted for freeze drying materials having potentially corrosive vapors, which materials are contained in at least one independent container, said freeze drying system including:
   a manifold means having at least one port for communication with said container containing said material to be freeze dried;
   freeze drying condenser means for condensing vapors produced by said material during drying;
   said condenser means having a pot within which is disposed a condensing trap having a condensing surface, said condensing trap being in communication with said container containing said material to be dried;
   refrigeration means associated with said condenser means;
   a first heat transfer means including a highly thermally conductive mesh for transferring thermal energy between said pot and said condensing surface of said condensing trap to maintain said condensing surface at a low temperature during a freeze drying operation; and,
   vacuum means in communication with said condenser means for applying a vacuum to said system throughout said freeze drying operation.

2. The freeze drying system of claim 1 wherein said pot includes a bottom, generally vertically extending side walls, and an opening at its top;
   said condensing trap is removably disposed within said pot and has the same general configuration as said pot, with the exterior dimensions of said condensing trap being slightly less than the interior dimensions of said pot to provide a space between adjacent surfaces of said pot and said condensing trap; and,
   said mesh is disposed within said space between said adjacent surfaces of said pot and said condensing trap.

3. The freeze drying system of claim 1 wherein said condensing trap includes a generally cylindrical hollow vessel formed of a corrosion resistant material with an opening at its top, said trap having an elongated stem opening into the interior of said trap and extending from the surface of said trap near the top, and a closure means formed to close said opening at the top of said trap.

4. The freeze drying system of claim 1 wherein a second heat transfer means is disposed about said pot in a direct heat transfer relationship therewith.

5. The freeze drying system of claim 4 wherein said second heat transfer means is a sheet formed of a highly thermally conductive material wrapped about said pot in a direct heat transfer relationship therewith for uniform transfer of thermal energy between said refrigeration means and said pot.

6. The freeze drying system of claim 1 wherein said first heat transfer means is comprised of a plurality of randomly disposed surfaces formed of a highly thermally conductive material, said surfaces forming said mesh for uniformly transferring thermal energy between said condensing trap and said pot.

7. The freeze drying system of claim 6 wherin said mesh is formed of a plurality of strands of copper randomly disposed to form said mesh for providing uniform transfer of thermal energy between said condensing trap and said pot.

8. The freeze drying system of claim 6 wherein said first heat transfer means may include said mesh used in conjunction with a thermally conductive fluid.

9. For use in a freeze drying system, a vacuum condenser including:
 a pot;
 a condensing trap having a condensing surface, said condensing trap being removably disposed within said pot; and,
 a plurality of randomly disposed surfaces of a highly thermally conductive material formed in a mesh for transferring thermal energy between said pot and said condensing surface.

10. The vacuum condenser of claim 9 for use in a freeze drying system wherein said pot includes a bottom, generally vertically extending sidewalls, and an opening at its top;
 said condensing trap is removeably disposed within said pot, with the exterior dimensions of said condensing trap being slightly less than the interior dimensions of said pot to provide a space between adjacent surfaces of said pot and said condensing trap; and,
 said mesh is disposed within said space between adjacent surfaces of said pot and said condensing trap.

11. The vacuum condenser of claim 9 wherein said mesh is formed of a plurality of strands of copper randomly disposed to form said mesh for providing uniform transfer of thermal energy between said condensing trap and said pot.

* * * * *